United States Patent
Wang et al.

(10) Patent No.: US 10,200,284 B2
(45) Date of Patent: Feb. 5, 2019

(54) PACKET PROCESSING METHOD AND DEVICE

(71) Applicant: Huawei Technologies Co., Ltd., Shenzhen (CN)

(72) Inventors: Xiaozhong Wang, Beijing (CN); Jun Gong, Beijing (CN); Zhen Wang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 280 days.

(21) Appl. No.: 15/198,010

(22) Filed: Jun. 30, 2016

(65) Prior Publication Data
US 2017/0201454 A1   Jul. 13, 2017
US 2018/0324095 A9   Nov. 8, 2018

Related U.S. Application Data

(63) Continuation of application No. PCT/CN2014/091072, filed on Nov. 14, 2014.

(30) Foreign Application Priority Data

Dec. 31, 2013   (CN) .......................... 2013 1 0754645

(51) Int. Cl.
   *H04L 12/741*   (2013.01)
   *H04L 29/06*   (2006.01)
(52) U.S. Cl.
   CPC ............ *H04L 45/745* (2013.01); *H04L 45/54* (2013.01); *H04L 69/22* (2013.01)
(58) Field of Classification Search
   None
   See application file for complete search history.

(56) References Cited

U.S. PATENT DOCUMENTS 7,548,928 B1 * 6/2009 Dean ................. G06F 17/30985
8,165,146 B1 * 4/2012 Melick ................. H04B 1/7163
                                                        370/390

(Continued)

FOREIGN PATENT DOCUMENTS

CN   102843299 A   12/2012
CN   103179044 A    6/2013

(Continued)

OTHER PUBLICATIONS

Pfaff, B. et al., "OpenFlow Switch Specification," Open Networking Foundation, Jun. 25, 2012, pp. 1-106, Version 1.3.0 (Wire Protocol 0x04).

*Primary Examiner* — Kenny S Lin
(74) *Attorney, Agent, or Firm* — Slater Matsil, LLP

(57) ABSTRACT

Embodiments provide a packet processing method and a device. The method includes: acquiring a first packet, and determining an identifier of a first table. The method also includes determining description information of the first table, and performing first processing on the first packet according to the description information and the first table, where the first table is a convention table. The method also includes determining an identifier of a next table according to the description information of the first table, where the identifier of the next table corresponds to description information of the next table. The method also includes processing, according to the description information, and the next table, the first packet that has undergone the first processing.

13 Claims, 3 Drawing Sheets

(56) References Cited

U.S. PATENT DOCUMENTS

| | | |
|---|---|---|
| 2002/0136207 A1 | 9/2002 | Matsumoto et al. |
| 2003/0097454 A1 | 5/2003 | Yamakawa et al. |
| 2013/0177020 A1 | 7/2013 | Miyazaki |
| 2013/0201984 A1* | 8/2013 | Wang ................ H04L 49/3009 370/389 |
| 2015/0036542 A1* | 2/2015 | Xia et al. ............ H04L 12/462 370/254 |
| 2016/0234097 A1* | 8/2016 | Chang ................ H04L 12/6418 |

FOREIGN PATENT DOCUMENTS

| | | |
|---|---|---|
| CN | 103401783 A | 11/2013 |
| CN | 103428094 A | 12/2013 |
| CN | 103731377 A | 4/2014 |
| WO | 2013152496 A1 | 10/2013 |

\* cited by examiner

PACKET PROCESSING METHOD AND DEVICE

CROSS-REFERENCE TO RELATED APPLICATIONS

This application is a continuation of International Application No. PCT/CN2014/091072, filed on Nov. 14, 2014, which claims priority to Chinese Patent Application No. 201310754645.X, filed on Dec. 31, 2013, both of which are hereby incorporated by reference in their entireties.

TECHNICAL FIELD

Embodiments of the present invention relate to the field of information technologies, and in particular, to a packet processing method and a device.

BACKGROUND

A conventional packet forwarding process is entirely controlled by a switch/router. The switch/router controls an acquired packet by using a conventional forward table. Content of the conventional forward table is determined according to a format agreed by microcode of a forwarding plane, and a control plane. That is, content in each field of the conventional forward table is agreed by the microcode of the forwarding plane and a drive of the control plane. The conventional forward table may be a bridge table or a route table. A packet control process entirely implemented by control by the switch/router has advantages of high performance and mature technologies. However, the packet control process entirely implemented by control by the switch/router is insufficiently flexible, and cannot well adapt to a change of a service requirement.

With development of technologies, an openflow technology emerges. The openflow technology changes a forwarding process originally entirely controlled by a switch/router to a forwarding process jointly controlled by an OpenFlow switch and a controller. The OpenFlow technology implements separation between data forwarding and route control. The OpenFlow technology completes a forwarding processing process, from input to output, of a packet by using a pipeline of a multi-stage flow table. Specifically, the flow table is formed by multiple flow table entries, and each flow table entry corresponds to one forwarding rule. A destination port of the packet is obtained by searching the flow table. The flow table includes a match field, an instruction field, and a counter field. The match field is used to match a packet. The instruction field is used to process a packet. The processing may be modifying a packet, encapsulating a packet, decapsulating a packet, or forwarding a packet. A packet control process implemented by using the OpenFlow technology can flexibly adapt to a change of a service requirement. However, the OpenFlow technology has low performance and the technology is immature.

SUMMARY

Embodiments of the present invention provide a packet processing method and a device, which helps to give consideration of packet processing to both a requirement for service performance and a requirement for service flexibility.

According to a first aspect, an embodiment provides a packet processing method. The method includes: acquiring a first packet; determining an identifier of a first table; determining description information, corresponding to the identifier of the first table, of the first table; and performing first processing on the first packet according to the description information of the first table, and the first table, where the first table is a convention table. The method also includes determining an identifier of a next table according to the description information of the first table, where the identifier of the next table corresponds to description information of the next table; and processing, according to the description information of the next table, and the next table, the first packet that has undergone the first processing, where the next table is a convention table or a flow table.

With reference to the first aspect, in a first possible implementation manner, the performing first processing on the first packet according to the description information of the first table, and the first table includes: determining a first processing program and the first table according to the description information of the first table; and performing the first processing on the first packet according to the first processing program and the first table.

With reference to the first possible implementation manner, in a second possible implementation manner, the performing the first processing on the first packet according to the first processing program and the first table includes: determining an entry of the first table; and performing the first processing on the first packet according to the entry of the first table by using the first processing program.

With reference to the first possible implementation manner or the second possible implementation manner, in a third possible implementation manner, the description information of the first table includes: an identifier of the first processing program, a type of the first table, a base address of the first table, expression information of a search key of the first table, and a length of an action entry of the first table.

With reference to the first aspect or any one of the foregoing possible implementation manners, in a fourth possible implementation manner, the determining an identifier of a next table according to the description information of the first table includes: determining the identifier of the next table according to the entry of the first table.

According to a second aspect, an embodiment provides a device, where the device includes: an acquiring unit, configured to acquire a first packet. The device also includes a first determining unit, configured to determine an identifier of a first table; a second determining unit, configured to determine description information, corresponding to the identifier of the first table, of the first table. The device also includes a first processing unit, configured to perform first processing on the first packet according to the description information, determined by the second determining unit, of the first table, and the first table, where the first table is a convention table. The device also includes a third determining unit, configured to determine an identifier of a next table according to the description information of the first table, where the identifier of the next table corresponds to description information of the next table. The device also includes a second processing unit, configured to process, according to the next table and the description information of the next table that are determined by the third determining unit, the first packet that has undergone the first processing, where the next table is a convention table or a flow table.

With reference to the second aspect, in a first possible implementation manner, the first processing unit is specifically configured to determine a first processing program and the first table according to the description information of the first table; and perform the first processing on the first packet according to the first processing program and the first table.

With reference to the first possible implementation manner, in a second possible implementation manner, the first processing unit is specifically configured to determine an entry of the first table, and perform the first processing on the first packet according to the entry of the first table by using the first processing program.

With reference to the second aspect or either of the foregoing possible implementation manners, in a third possible implementation manner, the third determining unit is specifically configured to determine the identifier of the next table according to the entry of the first table.

According to the embodiments, a processing program of a packet may jump between a convention table and a convention table, between a convention table and a flow table, or between a flow table and a flow table. In this way, consideration can be given to both an advantage that a convention table has high forwarding performance and an advantage that a flow table can flexibly adapt to a requirement of a service change. In the present invention, high performance of a convention table and flexibility of a flow table are combined, which helps to give consideration to both packet processing performance of a forwarding device and programmability of the forwarding device.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The technical solutions provided in the embodiments relate to a convention table. An entry of the convention table includes a parameter provided for a processing program. The processing program processes a packet according to the entry of the convention table. For example, the convention table may be a table used in a conventional packet forwarding process entirely controlled by a switch/router. For example, the convention table may be a BE or an RE. For convenience of description, in the present invention, a process of controlling packet processing according to a convention table is briefly referred to as a "convention table processing pipeline". In the convention table processing pipeline, each stage of the packet processing is briefly referred to as a "convention table processing process".

The technical solutions provided in the embodiments relate to an OpenFlow technology. For terms (which include, but are not limited to a flow table, a flow table entry, an instruction, and an action) related to the OpenFlow technology, reference may be made to the OpenFlow Switch Specification version 1.4.0. For convenience of reading, the flow table is described herein. The flow table is a table related to the OpenFlow technology. Specifically, the flow table includes a match field, an instruction field, and a counter field. The match filed is used to match a packet. The instruction field is used to process a packet. The processing may be modifying a packet, encapsulating a packet, decapsulating a packet, discarding a packet, forwarding a packet, or performing a counting operation on a packet. In other words, the flow table not only may include a parameter provided for a processing program, but also may include the processing program (the processing program may be an instruction or an action). For convenience of description, a process of controlling packet processing according to the flow table is briefly referred to as a "flow table processing pipeline". In the flow table processing pipeline, each stage of the packet processing is briefly referred to as a "flow table processing process". If a packet needs to be processed by using the convention table processing process and the flow table processing process, such a processing procedure is collectively referred to as a "mixed processing pipeline".

Figure 1:
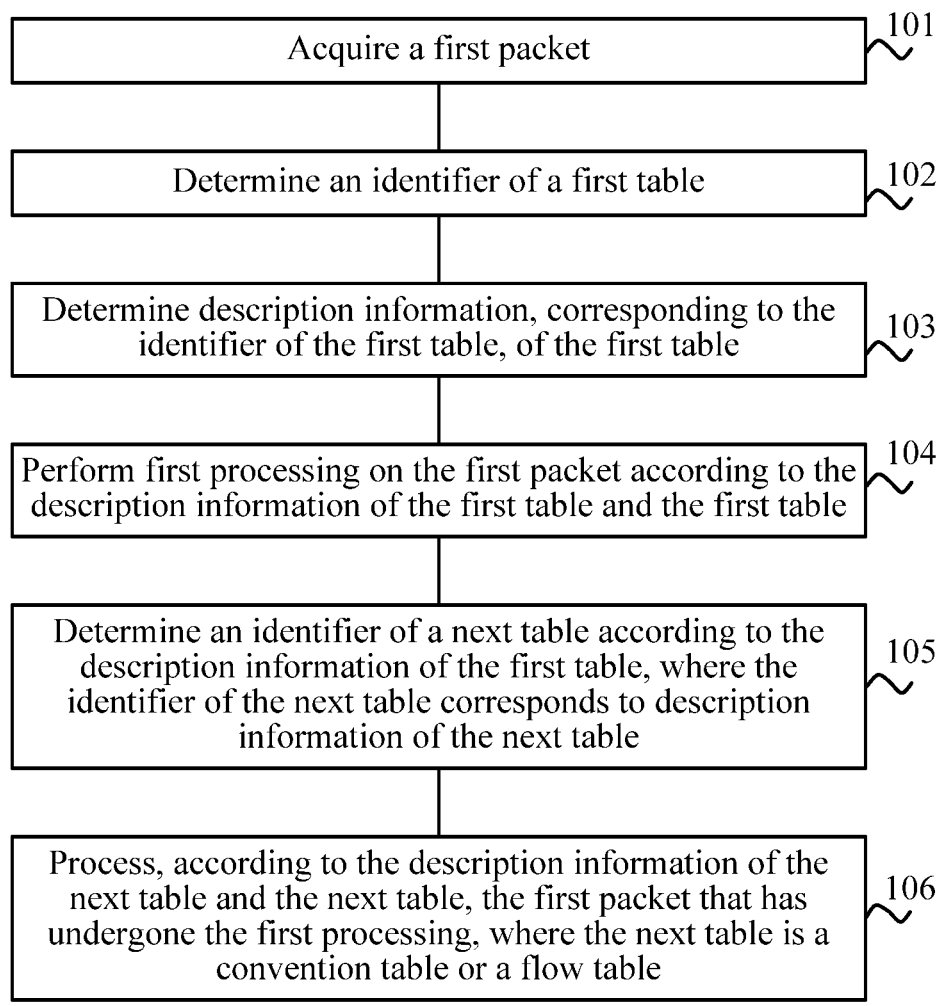
FIG. 1 is a schematic flowchart of a packet processing method according to an embodiment.

FIG. 1 is a schematic flowchart of a packet processing method according to an embodiment. An execution body of the method may be a network apparatus. Specifically, the execution body may be a network processor (NP for short) in the network apparatus. Specifically, the execution body may be a search engine in the NP. The network device may be a router, a network switch, a firewall, a load balancer, or a data center. The network switch may be an OpenFlow switch.

101. Acquire a first packet.

For example, during specific implementation of step 101, the first packet may be received, or the first packet may be generated.

102. Determine an identifier of a first table.

For example, during specific implementation of step 102, the identifier of the first table may be obtained by using the table. The identifier of the first table is carried in the table. During specific implementation of step 102, it may also be that default code instructs the execution body to process the first packet according to description information of the first table, and the first table. The default code is stored in the execution body.

103. Determine description information, corresponding to the identifier of the first table, of the first table.

For example, the description information of the first table may be stored in an array. During specific implementation of step 103, the description information of the first table may be obtained by using the identifier of the first table as an index and by accessing the array.

For example, a memory of the execution body includes a storage area used for storing a computer program and a storage area used for storing data. The description information of the first table is stored in the storage area used for storing data. For example, the description information of the first table is generated by a controller. The controller sends the description information of the first table to the execution body through a control channel.

104. Perform first processing on the first packet according to the description information of the first table, and the first table.

For example, the first table is a convention table.

Alternatively, the first table is a flow table.

105. Determine an identifier of a next table according to the description information of the first table, where the identifier of the next table corresponds to description information of the next table.

106. Process, according to the description information of the next table, and the next table, the first packet that has undergone the first processing, where the next table is a convention table or a flow table.

According to the method shown in FIG. 1, after first processing corresponding to a convention table is performed, a processing program may jump, according to a corresponding identifier of a next table, to a convention table processing process or a flow table processing process to implement subsequent processing of a packet. That is, the processing program may jump between the convention table and a flow table. In this way, consideration can be given to both a characteristic of high processing performance of the convention table and a characteristic of flexible processing of the flow table, thereby improving efficiency of packet processing. In addition, an identifier, corresponding to the next table for processing the packet, of the next table is determined according to description information of a first table. The description information of the first table may not be controlled by microcode. In this way, when the next table for processing the packet needs to be changed, the change of the next table may be implemented by modifying the identifier of the next table, without a need to be implemented by modifying the microcode. For example, a table for processing a packet is a convention table A. After the convention table A completes the processing of the packet, a convention table B needs to be used for processing the packet. If it is expected that after the convention table A completes the processing of the packet, a convention table C is used instead for processing the packet, an identifier of a next table may be modified from an identifier of the table corresponding to the convention table B into an identifier of the table corresponding to the convention table C. In this way, when the next table needs to be changed, a position that needs to be modified can be rapidly determined, and the next table can be conveniently changed by modifying the identifier of the next table. In addition, a workload of modifying the identifier of the next table is far lighter than a workload of modifying the microcode.

Figure 2:
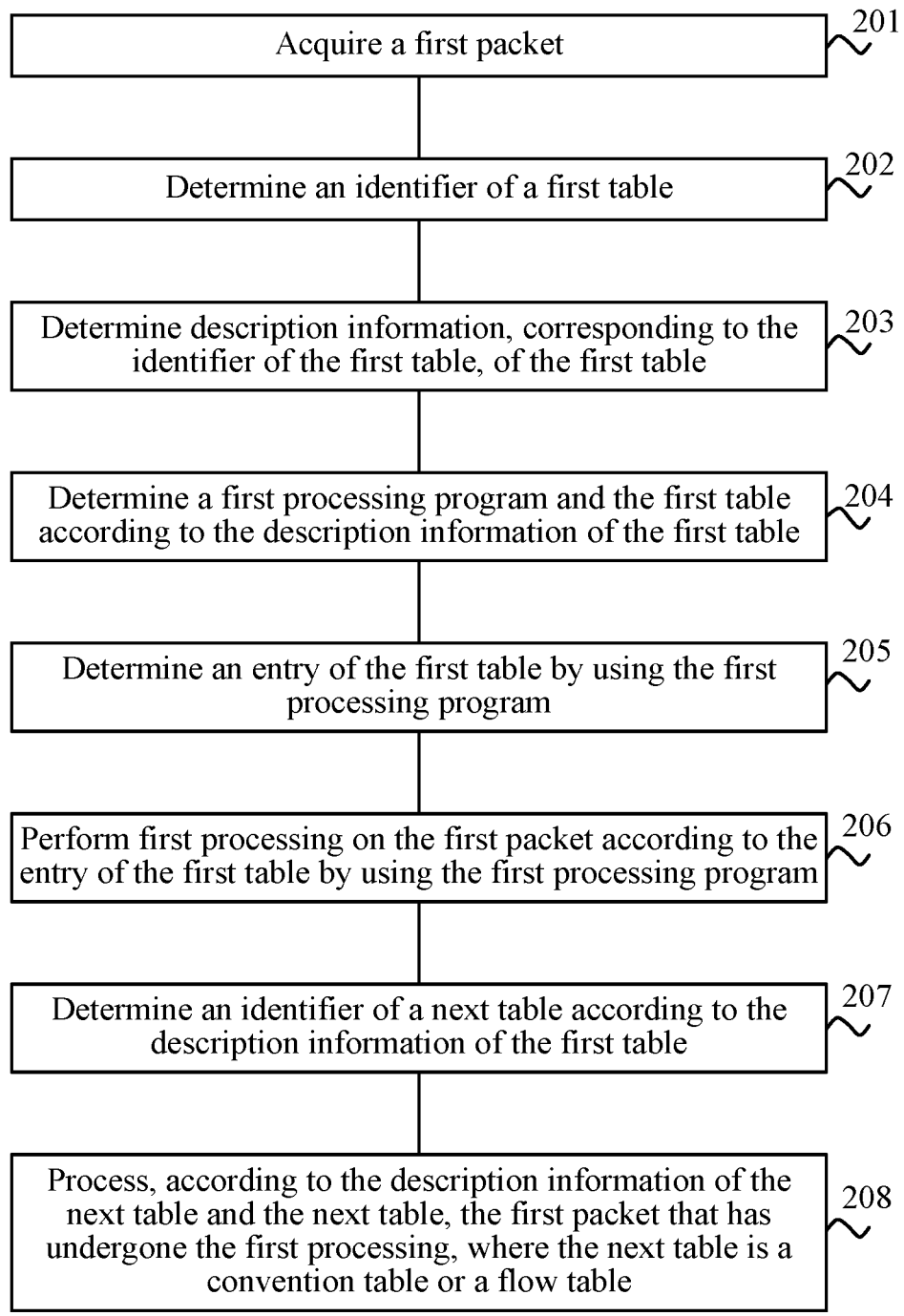
FIG. 2 is a schematic flowchart of a packet processing method according to an embodiment.

FIG. 2 is a schematic flowchart of a packet processing method according to an embodiment. The method shown in FIG. 2 is a specific embodiment of the method shown in FIG. 1.

201. Acquire a first packet.

The "first" in the "first packet" in this specification is only for distinguishing a packet, but is not intended for limiting the packet. Therefore, it may be understood that this first packet may be any packet in a mixed processing pipeline. That is, the first packet may be a packet for which one time or several times of processing is completed, or may be a packet received from another device.

202. Determine an identifier of a first table.

203. Determine description information, corresponding to the identifier of the first table, of the first table.

By performing step 204 to step 206, first processing can be performed on the first packet according to the description information of the first table, and the first table.

204. Determine a first processing program and the first table according to the description information of the first table.

For example, the first table is a convention table.

Alternatively, the first table is a flow table.

The description information of the first table may include: an identifier of the first processing program, a type of the first table, a base address of the first table, description information of a search key of the first table, and a length of an action entry of the first table. The description information of the search key of the first table is used for describing a search key of a first match table. For example, the type of the first table includes two parts of information: a first part indicates that the table is a convention table, and a second part indicates a match type of the table, where the table may be an arbitrary wildcard match access control list (ACL for short) table, a longest prefix match (LPM for short) table, an exact match (EM for short) table, a direct access table, or the like.

Specifically, the first processing program is determined according to the identifier of the first processing program in the description information of the first table. The first table is a convention table. The first table corresponds to the first processing program. For example, a different convention table corresponds to a different processing program. The first processing program accesses the first table according to the base address of the first table, the type of the first table, and the expression information of the search key of the first table that are in the description information of the first table.

By performing step 205 and step 206, after the first table is determined, first processing can be performed on the first packet according to the first processing program and the first table.

205. Determine an entry of the first table by using the first processing program.

For example, the first processing program may determine the search key according to the expression information of the search key of the first table. The expression information of the search key of the first table is used for describing a manner for acquiring the search key. The search key may include a field in a packet header of the first packet. The search key may include a port for receiving the first packet.

Specifically, after the first table is determined, the first processing program delivers the search key to the first table for searching the entry of the first table.

206. Perform first processing on the first packet according to the entry of the first table by using the first processing program.

Specifically, when the first processing program performs the first processing on the first packet, content of the entry of the first table is used as an input parameter of the packet processing. That is, the first processing program processes the first packet according to the entry of the first table. The first processing program may be used for computing a checksum of headers of the Transmission Control Protocol (TCP for short). The first processing program may also be used for executing network address translation (NAT for short). Specifically, the first packet may be an Internet Protocol (IP for short) packet from a private network. The first processing program may be used for modifying a source IP address and a source port in an IP header of the IP packet to generate a new IP packet. The new IP packet will be transmitted in a public network.

A first embodiment is provided below as a specific example for describing step 205 and step 206.

The first packet is an IP packet. The execution body is a NAT apparatus. The first table is a NAT flow table.

A host located in a private network sends the IP packet to a server in a public network. An IP address of the host is 10.1.1.1. An IP address of the server is 100.1.1.1. The IP packet carries the following feature information (referring to Table 1).

TABLE 1

| Feature information | | | | |
|---|---|---|---|---|
| Destination IP address | Destination port | Source IP address | Source port | Protocol number |
| 100.1.1.1 | 80 | 10.1.1.1 | 2000 | TCP |

After the NAT apparatus receives the IP packet, the feature information shown in Table 1 is acquired according to expression information of a search key of the first table. The NAT apparatus searches, by using the feature information as the search key, the NAT flow table for an entry, which matches the feature information, of the first table. For the entry of the first table, refer to an entry of a NAT flow table in Table 2. 50.1.1.1 is an IP address of a public network allocated by the NAT apparatus, and 100 is a port number allocated by the NAT apparatus.

TABLE 2

Flow table entry of a NAT table

| Destination IP address | Destination port | Source IP address | Source port | Protocol number | Source IP address after substitution | Source port after substitution |
|---|---|---|---|---|---|---|
| 100.1.1.1 | 80 | 10.1.1.1 | 2000 | TCP | 50.1.1.1 | 100 |

The NAT apparatus processes the IP packet according to the first processing program. Specifically, the NAT apparatus modifies the source IP address in the IP packet into 50.1.1.1 by using 50.1.1.1 in the entry of the NAT flow table as an input parameter of the first processing program. The NAT apparatus modifies the source port in the IP packet into 100 by using 100 in the entry of the NAT flow table as an input parameter of the first processing program.

207. Determine an identifier of a next table according to the description information of the first table.

During specific implementation of step 207, the first table may be determined according to the description information of the first table. The identifier of the next table is obtained by accessing the first table. The first table includes the identifier of the next table.

Specifically, the identifier of the next table is determined according to the first table. For example, the first table includes the identifier of the next table. For example, each entry of the first table includes one identifier of the next table. The identifier of the next table is used for indexing description information of the next table. The description information of the next table may be description information of a convention table, or may be description information of a flow table. The identifier of the next table corresponding to the first table may be an entry field used as the entry of the first table, or may be in an independent identifier table of the next table.

A second embodiment is provided below as a specific embodiment for describing step 207.

Figure 3:
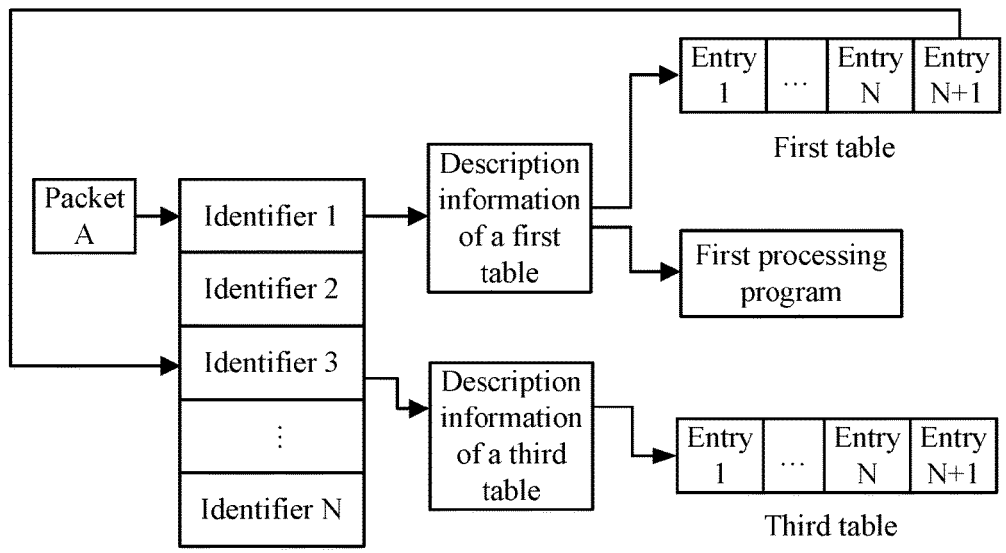
FIG. 3 is a schematic diagram of a packet processing method according to an embodiment.

The entry of Table 2 in the first embodiment may further include the identifier of the next table. For example, the identifier of the next table is 5. In this case, an entry of a NAT flow table is shown in FIG. 3. In this way, the NAT apparatus obtains the identifier of the next table by accessing the entry of the NAT flow table.

The first packet that has undergone the first processing may be the first packet, or may be another packet. If the first packet is modified during the first processing, the first packet that has undergone the first processing is another packet, or if the first packet is not modified during the first processing, the first packet that has undergone the first processing is the first packet.

Optionally, as an embodiment, in a case in which the next table is a flow table, the flow table may be a protocol oblivious forwarding (POF for short) table. That is, when the first processing program processes the first packet, it is found that a protocol type of the first packet is unknown. In this case, the first packet may be forwarded to the POF table, and the first packet for which the first processing is completed is processed by using a POF technology. When the first packet for which the first processing is completed is processed by using the POF table, a type of the packet does not need to be sensed, and the processing of the packet is performed by means of an offset and a length of specified data.

According to the method shown in FIG. 2, after first processing corresponding to a first table is performed on a packet, the packet may jump, according to a corresponding identifier of a next table, to a convention table processing process or a flow table processing process to perform subsequent processing. That is, the packet may jump between a convention table and a flow table. In this way, consideration can be given to both a characteristic of high processing performance of the convention table and a characteristic of flexible processing of the flow table, thereby improving efficiency of packet processing. For example, one flow table processing process may be inserted in multiple convention table processing processes, where a match entry of the flow table processing process is different from any convention table, and the flow table processing process is entirely used for flexible policy control. The insertion of one flow table processing process has little effect on overall processing performance of the packet. In this way, not only it can ensure that the performance is not significantly reduced, but also flexibility of packet processing can be

TABLE 3

Flow table entry of a NAT table

| Destination IP address | Destination port | Source IP address | Source port | Protocol number | Source IP address after substitution | Source port after substitution | Identifier of a next table |
|---|---|---|---|---|---|---|---|
| 100.1.1.1 | 80 | 10.1.1.1 | 2000 | TCP | 50.1.1.1 | 100 | 5 |

208. Process, according to description information of the next table, and the next table, the first packet that has undergone the first processing, where the next table is a convention table or a flow table.

improved. Particularly, when a POF table is inserted in a convention table processing process, a packet of which a protocol type is unknown may be processed by using the POF table.

It may be understood that when the packet processing method provided in this embodiment is used, a first table for a mixed processing pipeline should be determined. In other words, all packets start to be processed from the first table. The first table may be a convention table, or may be a flow table. After first processing corresponding to the first table is completed, the packet may jump to a processing process of a different type according to a need.

To help to understand the present invention better, the present invention is further described with reference to an embodiment of FIG. 3. It should be noted that, the embodiment shown in FIG. 3 only helps to understand the present invention better, but is not intended for limiting the present invention.

FIG. 3 is a schematic diagram of a packet processing method according to an embodiment.

As shown in FIG. 3, a packet A is a received packet. An identifier 1 is an identifier of a first table of a mixed processing pipeline, and therefore, the packet A first needs to be processed by using the table corresponding to the identifier 1. Specifically, the identifier 1 corresponds to description information of the first table. The first table and a first processing program are determined according to the description information of the first table, where the first table is a convention table. The first processing program processes the packet A by using an entry of the first table. Content included in an entry N+1 of the first table is an identifier of a next table. In this embodiment, the next table is a table corresponding to an identifier 3. Therefore, after the processing of the packet A is completed, it is jumped to the identifier 3 according to the content of the entry N+1. Then, a third processing program and a third table are determined according to description information, corresponding to the identifier 3, of the third table, where the third processing program is included in the third table. That is, the third table is a flow table that includes a processing program and that also includes a parameter that needs to be used by the processing program. The third processing program may process, according to an entry in the third table, the packet A for which the processing by the first processing program is completed. Afterwards, it may continue to be jumped to a next table according to a need, to continue to process the packet A for which the processing by the third processing program is completed.

Figure 4:
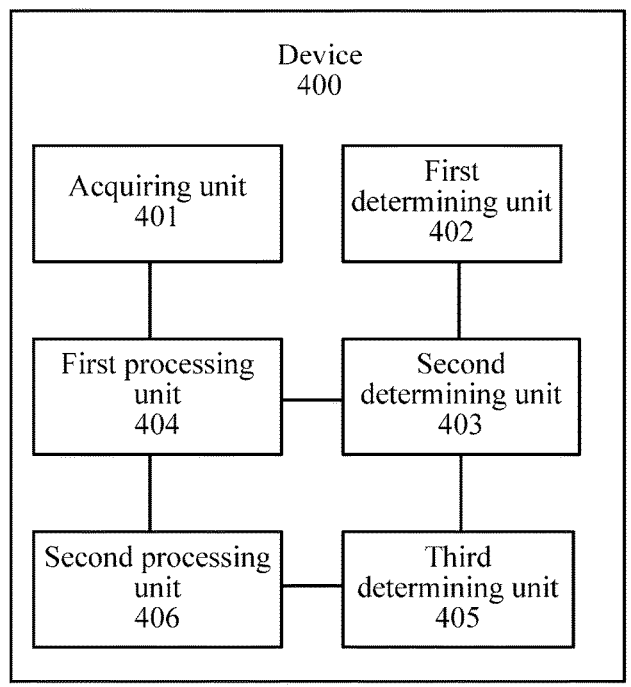
FIG. 4 is a structural block diagram of a device according to an embodiment.

FIG. 4 is a structural block diagram of a device according to an embodiment. The device shown in FIG. 4 can execute the method shown in FIG. 1 or FIG. 2. A device 400 shown in FIG. 4 includes an acquiring unit 401, a first determining unit 402, a second determining unit 403, a first processing unit 404, a third determining unit 405, and a second processing unit 406.

The acquiring unit 401 is configured to acquire a first packet.

The first determining unit 402 is configured to determine an identifier of a first table.

The second determining unit 403 is configured to determine description information, corresponding to the identifier of the first table, of the first table.

The first processing unit 404 is configured to perform first processing on the first packet according to the description information, determined by the second determining unit 403, of the first table, and the first table.

For example, the first table is a convention table.

Alternatively, the first table is a flow table.

The third determining unit 405 is configured to determine an identifier of a next table according to the description information of the first table, where the identifier of the next table corresponds to description information of the next table.

The second processing unit 406 is configured to process, according to the next table and the description information of the next table that are determined by the third determining unit 405, the first packet that has undergone the first processing, where the next table is a convention table or a flow table.

According to the device shown in FIG. 4, after first processing corresponding to a first table is performed on a packet, a device 400 may control, according to a corresponding identifier of a next table, the packet to jump to a convention table processing process or a flow table processing process to perform subsequent processing. That is, the device 400 may control the packet to jump between a convention table and a flow table. In this way, consideration can be given to both a characteristic of high processing performance of the convention table and a characteristic of flexible processing of the flow table, thereby improving efficiency of packet processing. In addition, the next table for processing the packet is determined by the identifier of the next table, instead of being controlled by microcode. In this way, when the next table for processing the packet needs to be changed, the change of the next table may be implemented by modifying the identifier of the next table, without a need to be implemented by modifying the microcode. When the next table needs to be changed, a position that needs to be modified can be rapidly determined, and the next table can be conveniently changed by modifying the identifier of the next table. In addition, a workload of modifying the identifier of the next table is far lighter than a workload of modifying the microcode.

Further, the first processing unit 404 is specifically configured to determine a first processing program and the first table according to the description information of the first table; and perform the first processing on the first packet according to the first processing program and the first table.

Further, the first processing unit 404 is specifically configured to determine an entry of the first table, and perform the first processing on the first packet according to the entry of the first table by using the first processing program.

Further, the third determining unit 405 is specifically configured to determine the identifier of the next table according to the entry of the first table.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium and includes several instructions for instructing a computer device (which may be a personal computer, a server, a network device, or the like) or a processor to perform all or some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A packet processing method, wherein the method comprises:
    acquiring a first packet;
    determining an identifier of a first table;
    determining description information, corresponding to the identifier of the first table, of the first table;
    performing first processing on the first packet according to the description information of the first table, and according to the first table, wherein the first table is a convention table comprising an entry, the entry comprises a first parameter provided for a first processing program, and the first processing program is configured to process the first packet according to the entry;
    determining an identifier of a next table according to the description information of the first table, wherein the identifier of the next table corresponds to description information of the next table, and the first table comprises the identifier of the next table; and
    processing, according to the description information of the next table, and according to the next table, the first packet that has undergone the first processing, wherein the next table is a convention table or a flow table, and the flow table comprises a second processing program and a second parameter provided for the second processing program.

2. The method according to claim 1, wherein the performing first processing on the first packet according to the description information of the first table, and according to the first table, comprises:
    determining the first processing program and the first table according to the description information of the first table; and
    performing the first processing on the first packet according to the first processing program and the first table.

3. The method according to claim 2, wherein the performing the first processing on the first packet according to the first processing program and the first table comprises:
    determining the entry of the first table; and
    performing the first processing on the first packet according to the entry of the first table by using the first processing program.

4. The method according to claim 2, wherein the description information of the first table comprises: an identifier of the first processing program, a type of the first table, a base address of the first table, expression information of a search key of the first table, and a length of an action entry of the first table.

5. The method according to claim 1, wherein the determining an identifier of a next table according to the description information of the first table comprises:
    determining the identifier of the next table according to the entry of the first table.

6. A device comprising a processor and a non-transitory computer readable medium containing instructions that, when executed by the processor, causes the processor to:
    acquire a first packet;
    determine an identifier of a first table;
    determine description information, corresponding to the identifier of the first table, of the first table;
    perform first processing on the first packet according to the description information, of the first table, and according to the first table, wherein the first table is a convention table comprising an entry, the entry comprises a first parameter provided for a first processing program, and the first processing program is configured to process the first packet according to the entry;
    determine an identifier of a next table according to the description information of the first table, wherein the identifier of the next table corresponds to description information of the next table, and the first table includes the identifier of the next table; and
    process, according to the next table and the description information of the next table, the first packet that has undergone the first processing, wherein the next table is a convention table or a flow table, and the flow table includes a second processing program and a second parameter provided for the second processing program.

7. The device according to claim 6, wherein the non-transitory computer readable medium further contains instructions that, when executed by the processor, causes the processor to:
    determine the first processing program and the first table according to the description information of the first table; and perform the first processing on the first packet according to the first processing program and the first table.

8. The device according to claim 7, wherein the non-transitory computer readable medium further contains instructions that, when executed by the processor, causes the processor to:
determine the entry of the first table, and perform the first processing on the first packet according to the entry of the first table by using the first processing program.

9. The device according to claim 7, wherein the non-transitory computer readable medium further contains instructions that, when executed by the processor, causes the processor to:
determine the identifier of the next table according to the entry of the first table.

10. The device according to claim 6, wherein the instructions are configured to be executed by a processor to:
determine the first processing program and the first table according to the description information of the first table; and
perform the first processing on the first packet according to the first processing program and the first table.

11. The device according to claim 7, wherein the instructions are configured to be executed by a processor to:
determine the entry of the first table, and perform the first processing on the first packet according to the entry of the first table by using the first processing program.

12. The device according to claim 7, wherein the non-transitory computer readable medium further contains instructions that, when executed by the processor, causes the processor to:
determine the identifier of the next table according to the entry of the first table.

13. A non-transitory computer readable storage medium storing instructions, wherein the instructions are configured to be executed by a processor to:
acquire a first packet;
determine an identifier of a first table;
determine description information, corresponding to the identifier of the first table, of the first table;
perform first processing on the first packet according to the description information, of the first table, and according to the first table, wherein the first table is a convention table comprising an entry, the entry comprises a first parameter provided for a first processing program, and the first processing program is configured to process the first packet according to the entry;
determine an identifier of a next table according to the description information of the first table, wherein the identifier of the next table corresponds to description information of the next table, and the first table includes the identifier of the next table; and
process, according to the next table and the description information of the next table, the first packet that has undergone the first processing, wherein the next table is a convention table or a flow table, and the flow table includes a second processing program and a second parameter provided for the second processing program.

* * * * *